United States Patent [19]
Eriksson

[11] 3,818,298
[45] June 18, 1974

[54] SERIES A.C. COMMUTATOR MOTOR WITH STABILIZED SPEED

[75] Inventor: Ivar Eriksson, Linkoping, Sweden

[73] Assignee: Malte Manson AB, Linkoping, Sweden

[22] Filed: Feb. 27, 1973

[21] Appl. No.: 336,231

[52] U.S. Cl. ................................................ 318/332
[51] Int. Cl. .......................................... H02p 5/16
[58] Field of Search ..................... 318/227, 332, 345

[56] References Cited
UNITED STATES PATENTS
| | | | |
|---|---|---|---|
| 3,373,331 | 2/1968 | Dow | 318/345 |
| 3,384,801 | 5/1968 | Rodgers | 318/227 |
| 3,399,333 | 8/1968 | Canter | 318/345 |
| 3,461,370 | 8/1969 | Canter | 318/345 |

Primary Examiner—Robert K. Schaefer
Assistant Examiner—Thomas Langer
Attorney, Agent, or Firm—Pierce, Scheffler & Parker

[57] ABSTRACT

An a.c. series commutator motor is fed from the mains, in series with its field winding, the rotor winding and an antiparallel circuit of two diodes. A secondary winding coupled to the field winding, serving as a primary winding, supplies the load responsive voltage induced in the secondary winding to a control electrode of one of the two diodes via a rectifier and a diac for firing said diode at a certain load limit so as to maintain a constant motor speed independent of variations in the motor load.

5 Claims, 6 Drawing Figures

SERIES A.C. COMMUTATOR MOTOR WITH STABILIZED SPEED

This invention relates to an improved construction for an a.c. series commutator type motor the preamble of claim 1.

Commutator motors of the type wherein the field winding and the winding of the commutator type rotor are connected in series normally have a speed characteristic dropping with increasing load. When such motors are applied, for example, for driving grinding machines, this speed relation is of disadvantage because a full grinding effect presupposes a certain constant speed. Dropping speed brings about a substantial decrease in the grinding effect. This dependency on speed can involve inconveniencies also in working operations other than grinding.

For obtaining motors, which operate economically, i.e., in this conjunction motors with a substantially independent and constant speed, heretofore one has normally to use asynchronous motors, which hold a frequency-responsive speed up to their blocking moment. However, these motors are too large and heavy to being used in, for example, electric tools and they require a three-phase A.C. mains or components simulating such a mains.

Attempts have been made, therefore, to produce series motors, which are driven in a conventional way from a one-phase mains, but which by means of electronic control hold a speed substantially independent of the load.

Such a speed characteristic is achieved substantially by the features of the present invention wherein the series connected field and rotor windings also include in series therewith a circuit arrangement of two diodes connected anti-parallel. A secondary winding coupled to the field winding which also functions as a primary winding supplies the load responsive voltage induced in the secondary winding to a control electrode of one of the two diodes via a rectifier and a threshold voltage means such as a diac for firing that diode at a certain load limit so as to maintain the motor speed constant independent of variations in the load imposed upon the motor.

Embodiments of the invention are shown in the accompanying drawings, in which

The motor according to the present invention, thus, is so manufactured that the maximum no-load speed is achieved at half-wave operation, which is obtained by means of a control device described below in detail. The curves a and b in FIG. 2a show the half-wave and, respectively, full-wave operation without control.

Figure 2:
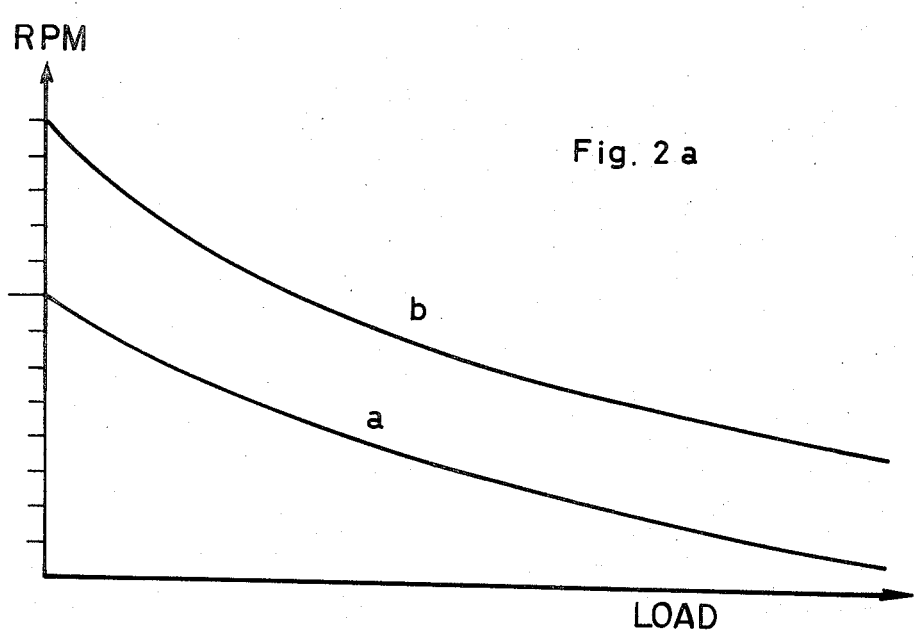
FIG. 2a shows by the curves a and b the load-dependency of the speed at half-wave and, respectively, full-wave operation without the control device according to the invention.
FIG. 2b shows the speed curve c obtained with the control device according to the invention.
Figure 2:
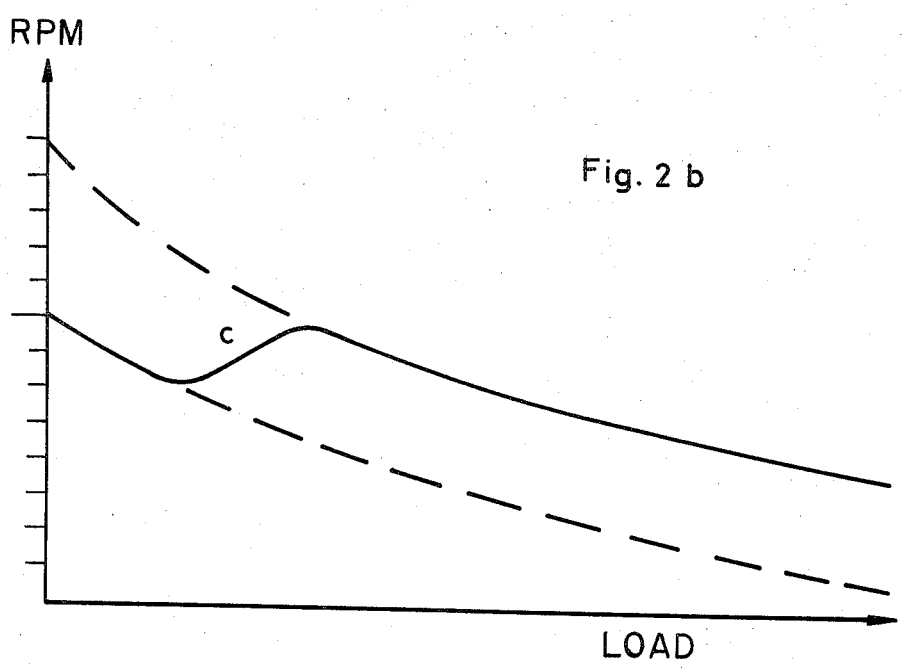

As one desires a high motor speed and as simultaneously the no-load speed must be held low, for example because of the safety requirement with respect to the circumferential speed of a grinding wheel, a control device is to be connected which according to the invention provides a speed curve c as shown in FIG. 2b.

Figure 1:
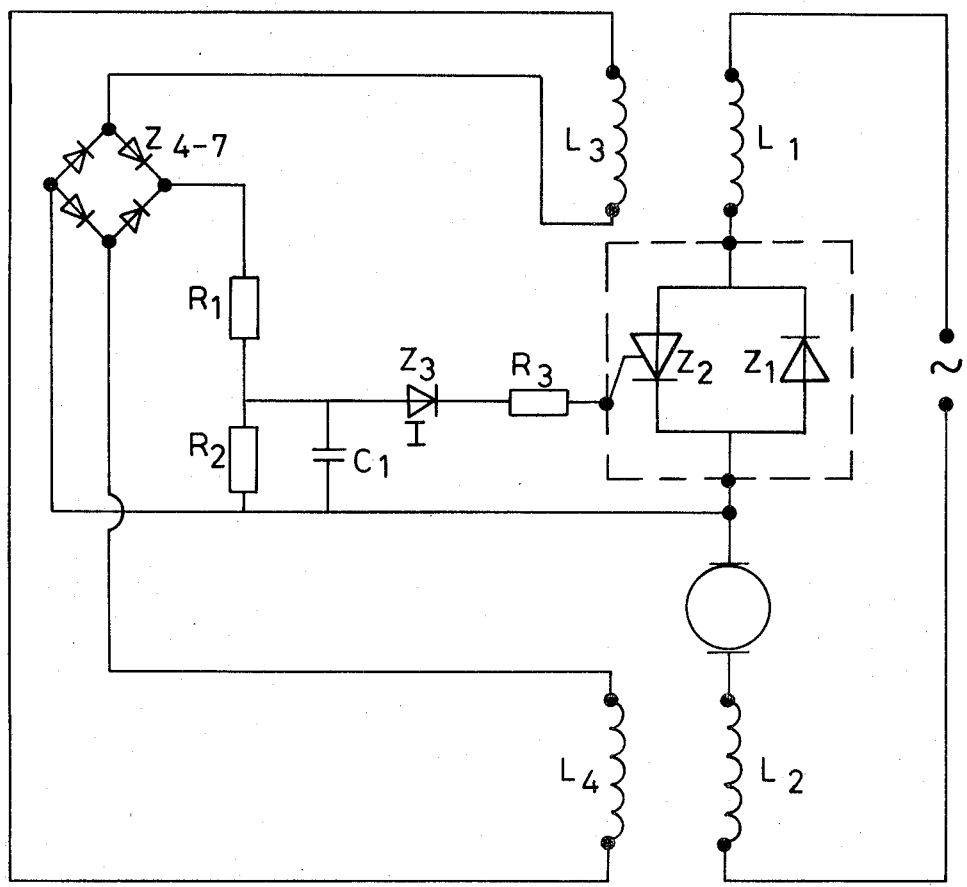
FIG. 1 shows a first embodiment.
Figure 4:
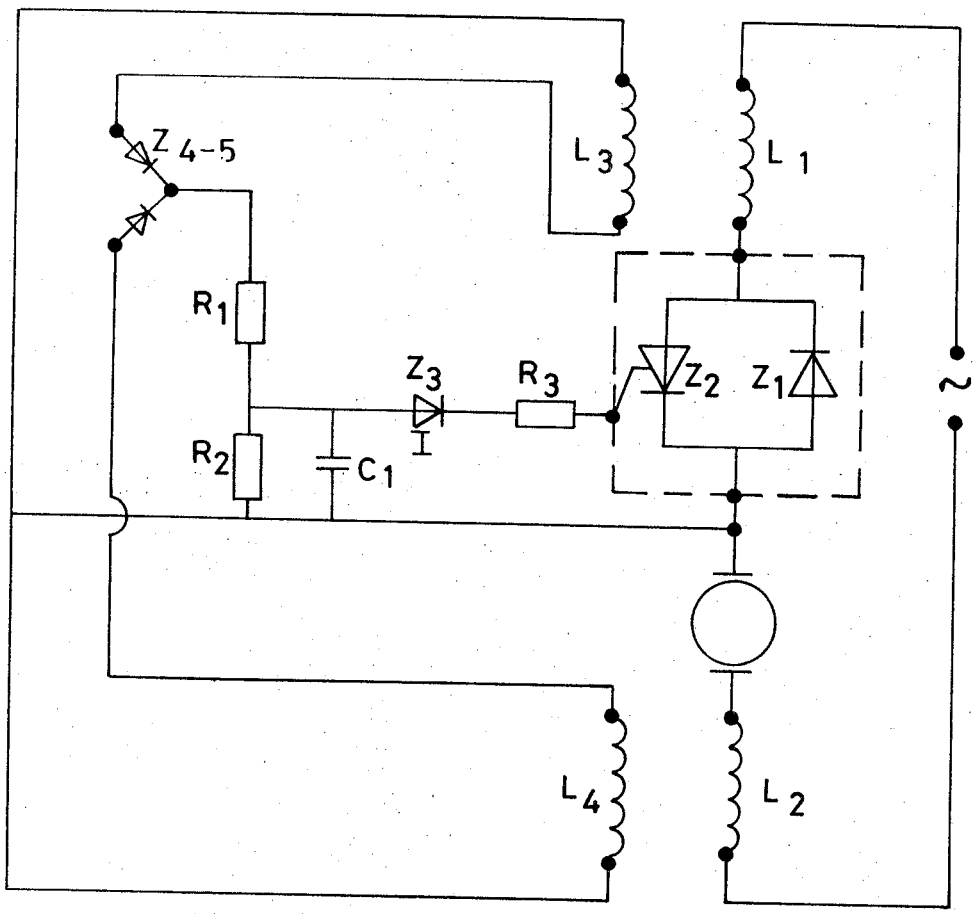
FIGS. 4 and 5 show two modified embodiments.

For effecting this control, according to the invention the field poles of the motor which may be two or more have been provided with an extra winding on one or several of the poles, in addition to the normal winding L1 and L2 fed from the mains, which additional winding or windings act as a secondary winding L3 and L4, FIG. 1, in a full-operation or economy transformer where the normal winding L1 and L2 mentioned above is the primary winding. FIG. 1 shows the full-operation transformer principle. From this secondary winding a voltage (control voltage) is obtained which is proportional to the motor load, and which is rectified in a bridge-connected rectifier Z4–7. Also other types of rectifiers, for example as shown in FIG. 4, can be utilized. The control unit operates as follows. When the voltage produced in the windings L3 and L4 achieves a predetermined value, a threshold voltage means, shown as a diac Z3 in FIG. 1, opens and the control electrode on the controlled diode (thyristor) Z2 renders this diode conductive for passing on one of the current polarities. The other polarity is always connected through the diode Z1.

Disturbances entering from the mains in the form of transients can affect the threshold means Z3 such as to cause undesired "ignitions" of the diode Z2, which are to be prevented. FIG. 1 shows a way how to prevent these disturbances from reaching the control electrode on the diode Z2.

R1 and R2 are resistors acting as a voltage divider. C1 is a capacitor, which together with the series resistor R1 comprised in the voltage divider R1 – R2 smoothes such undesired voltage tops. C1 also acts as an energy reserve for safely supplying ignition current to the controlled diode Z2 via diac Z3 and resistor R3.

It is important that the threshold means effects distinct on- and off-switchings, because the mains voltage is to be expected to vary by ± 10 percent. With the present connection, a voltage increase is obtained in the control device when both half-waves are being connected into the main circuit. (The transformer effect increases).

Figure 3:
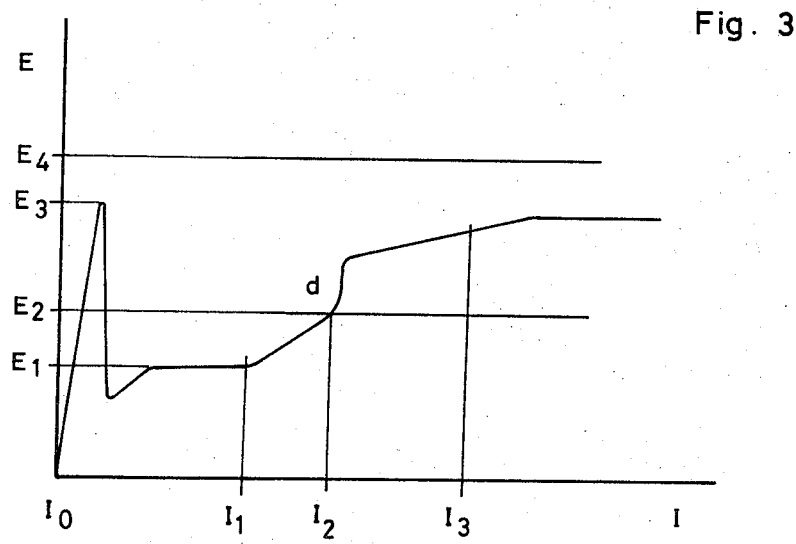
FIG. 3 shows the gradient of the control voltage.

This increase in voltage implies that Z2 need not work more at the limit of its lower boundary range for the function than during the initial phase to a higher load about the point E2–I2 in FIG. 3, but as soon as switching-in occurs in Z the voltage is increased as a knee "d" in the voltage curve, a so-called avalanche effect. See FIG. 3. At continued load the control voltage increases still more and levels in a point after the nominal load of the machine. There is, thus, no risk of overload of the control circuit. The resistor R3 is connected to prevent too high undue current from entering the ignition electrode of the controlled diode.

Figure 5:
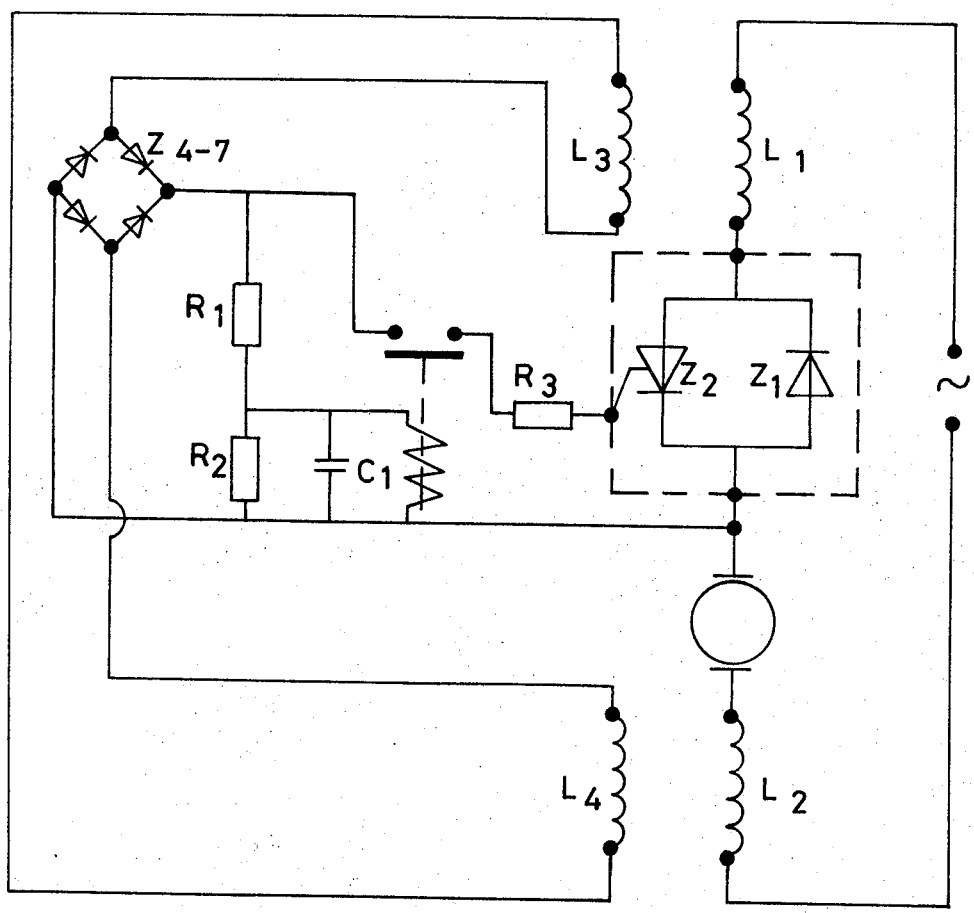

The embodiments according to FIGS. 4 and 5 agree with FIG. 1, except for FIG. 4 showing another type of rectifier and FIG. 5 showing a relay as threshold voltage means.

What I claim is:

1. An a.c. series commutator motor comprising at least one stator field winding, a rotor winding and two anti-paralleled diodes one of which is controllable, all connected in series for energization from an a.c. supply source, a secondary winding inductively coupled to said field winding and connected to a means for controlling said anti-parallel connected diodes, and means including a rectifier and a threshold voltage means for connecting said secondary winding to the control electrode of said controllable diode such that said controllable diode is rendered fully conductive for a certain value of said induced control voltage in such sense as to maintain a substantially constant motor speed with a varying load.

2. Motor as defined in claim 1 wherein said voltage threshold means is constituted by a diac connected at the output side of said rectifier.

3. Motor as defined in claim 1 wherein said voltage threshold means is a relay connected at the output side of said rectifier.

4. Motor as defined in claim 1, characterized in that the rectifier is a bridge-connected rectifier, one diagonal of which is connected to said secondary windings and its other diagonal is connected to the control electrode of a circuit including said threshold voltage means.

5. Motor as defined in claim 4, characterized in that the other diagonal of the bridge-connected rectifier is connected to said circuit via a voltage divider consisting of two resistors connected in series, and that the circuit, preferably between the voltage dividers and said threshold voltage means, comprises a shunt capacitor connected in parallel with one resistor and, preferably between the diac and the control electrode, comprises a series resistor, said shunt capacitor and the second of the two resistors connected in series acting for smoothing in order to eliminate undesired disturbing voltage tops and thereby irregular operation.

* * * * *

UNITED STATES PATENT OFFICE
CERTIFICATE OF CORRECTION

Patent No. 3,818,298            Dated June 18, 1974

Inventor(s) IVAR ERIKSSON

It is certified that error appears in the above-identified patent and that said Letters Patent are hereby corrected as shown below:

[30]    Foreign Application Data

March 3, 1972 - Sweden Patent 2731/72

Signed and sealed this 8th day of October 1974.

(SEAL)
Attest:

McCOY M. GIBSON JR.           C. MARSHALL DANN
Attesting Officer               Commissioner of Patents